(12) United States Patent
Ringstein

(10) Patent No.: US 11,428,308 B2
(45) Date of Patent: Aug. 30, 2022

(54) TRANSMISSION AND METHOD FOR ASSEMBLING A TRANSMISSION OF THIS TYPE

(71) Applicant: Magna Powertrain GmbH & Co KG, Lannach (AT)

(72) Inventor: Markus Ringstein, Graz (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 326 days.

(21) Appl. No.: 16/772,195

(22) PCT Filed: Nov. 12, 2018

(86) PCT No.: PCT/EP2018/080965
§ 371 (c)(1),
(2) Date: Jun. 12, 2020

(87) PCT Pub. No.: WO2019/115106
PCT Pub. Date: Jun. 20, 2019

(65) Prior Publication Data
US 2021/0071750 A1 Mar. 11, 2021

(30) Foreign Application Priority Data
Dec. 13, 2017 (DE) .......................... 102017222663.3

(51) Int. Cl.
*F16H 57/04* (2010.01)

(52) U.S. Cl.
CPC ..... *F16H 57/0423* (2013.01); *F16H 57/0472* (2013.01)

(58) Field of Classification Search
CPC ........................... F16H 57/043; F16H 57/0472
See application file for complete search history.

(56) References Cited

U.S. PATENT DOCUMENTS 7,383,933 B2 * 6/2008 Reed .................... F16H 63/3416
192/219.5
7,404,341 B2 * 7/2008 Nishino .................. F16H 47/02
74/606 R (Continued)

FOREIGN PATENT DOCUMENTS

DE 102012218054 B3 11/2013
DE 102015208630 A1 11/2015

(Continued)

OTHER PUBLICATIONS

International Search Report and Written Opinion dated Feb. 12, 2019 from International Patent Application No. PCT/EP2018/080965 (with English Translation of International Search Report).

*Primary Examiner* — Colby M Hansen
(74) *Attorney, Agent, or Firm* — Dickinson Wright PLLC

(57) ABSTRACT

Transmission having a housing composed of at least one first and second component for accommodating transmission components, wherein one of the components has at least one bore for the supply of oil, wherein one component has a bore, and a second component has a guide device for oil, which both open in the direction of a sealing surface between the first and second components, wherein the guide device engages axially around a sleeve which is under spring preload, or a sleeve which is under spring preload engages axially around the guide device.

11 Claims, 3 Drawing Sheets

(56) References Cited

U.S. PATENT DOCUMENTS

| | | | |
|---|---|---|---|
| 7,753,383 B2* | 7/2010 | Bareis | F16H 57/027 |
| | | | 74/606 R |
| 2003/0029692 A1* | 2/2003 | Rogner | F16D 25/083 |
| | | | 192/112 |
| 2014/0231174 A1 | 8/2014 | Iwase et al. | |

FOREIGN PATENT DOCUMENTS

| | | |
|---|---|---|
| EP | 3001070 A1 | 3/2016 |
| KR | 100775374 B1 | 11/2007 |
| WO | 2014156730 A1 | 10/2014 |

* cited by examiner

TRANSMISSION AND METHOD FOR ASSEMBLING A TRANSMISSION OF THIS TYPE

CROSS-REFERENCE TO RELATED APPLICATIONS

This application is a National Stage of International Application No. PCT/EP2018/080965, filed Nov. 12, 2018, which claims priority to DE102017222663.3, filed Dec. 13, 2017. The entire disclosures of each of the above applications are incorporated herein by reference.

FIELD OF THE INVENTION

The invention relates to a transmission and a method for assembling a transmission of this type.

BACKGROUND OF THE INVENTION

This section provides information related to the present disclosure which is not necessarily prior art.

In conventional transfer cases or transmissions oil guide devices are assembled where they are fully accessible and open to view in or on the housing.

Conventional solutions have an insertable tubular connection with O-ring as interface between the guide device and the housing. Here, when assembling, the bore must be freely accessible and open to view in order to ensure a secure fit. A guide device is fitted together with the clutch module in an intermediate housing, so that the tube end with O-ring can be threaded forwards into the bore in the intermediate housing. In so doing considerable fitting forces sometimes occur due to the pressure of the O-ring. These pressing forces and the necessary precise fitting into the bore can be achieved only under visual observation.

Such a transfer case is disclosed by DE 10 2015 208 630 A1.

In some embodiments the concept does not afford a view of the site where an oil guide device in a first component is connected to the oil ducting housing bore in a second component during the housing fitting operation. Using this conventional concept, it cannot be ensured that the bore has been located and that the operation to fit the clutch housing is not causing damage, since there is no clear view of the components.

EP 3 001 070 A1 discloses a wind power gear unit having two oil chambers. The two oil chambers are connected to one another by an oil ducting tube, which is arranged with one end in each of the openings. The openings each have a degree of taper with an internal cone. The ends of the tube arranged in the openings have a corresponding degree of taper with an external cone, which allows compensation for tolerances.

The object of the invention is to create a transmission having a leak-tight oil system which allows compensation for tolerances between components.

SUMMARY OF THE INVENTION

This section provides a general summary of the disclosure, and is not a comprehensive disclosure of its full scope or all of its features.

The object is achieved by a transmission having a housing composed of at least one first and second component for accommodating transmission components, wherein one of the components has at least one bore for the supply of oil, wherein one component has a bore, and a second component has a guide device for oil, which both open in the direction of a sealing surface between the first and second components, wherein the guide device engages axially around a sleeve which is under spring preload, or a sleeve which is under spring preload engages axially around the guide device.

This allows a sealed connection of the two communicating openings, wherein the spring preload compensates for axial tolerances and the plane sealing surface for radial tolerances.

It is advantageous here that the sleeve bears, on its outer diameter or on its inner diameter, a spring which is supported against an edge or a shoulder of the guide device.

The spring advantageously bears against the sleeve at an either radially inwardly or radially outwardly formed edge of the sleeve.

It is advantageous if the guide device is a component installable in the housing.

It is advantageous that the sleeve has an axial seal at the end side on the sealing surface.

Here the axial seal is inserted or injection molded.

It is advantageous that the diameter of the opening of one component is smaller than the inner diameter of the sleeve.

The sleeve advantageously has connecting means for connecting to the guide device.

The object is further achieved by a method for assembling a transmission, wherein a first and a second component of the housing are joined together at a sealing surface, wherein a guide device for oil is equipped with a sleeve which is connected to the guide device by connecting means, wherein a spring is preloaded.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DESCRIPTION OF THE INVENTION

Figure 1:
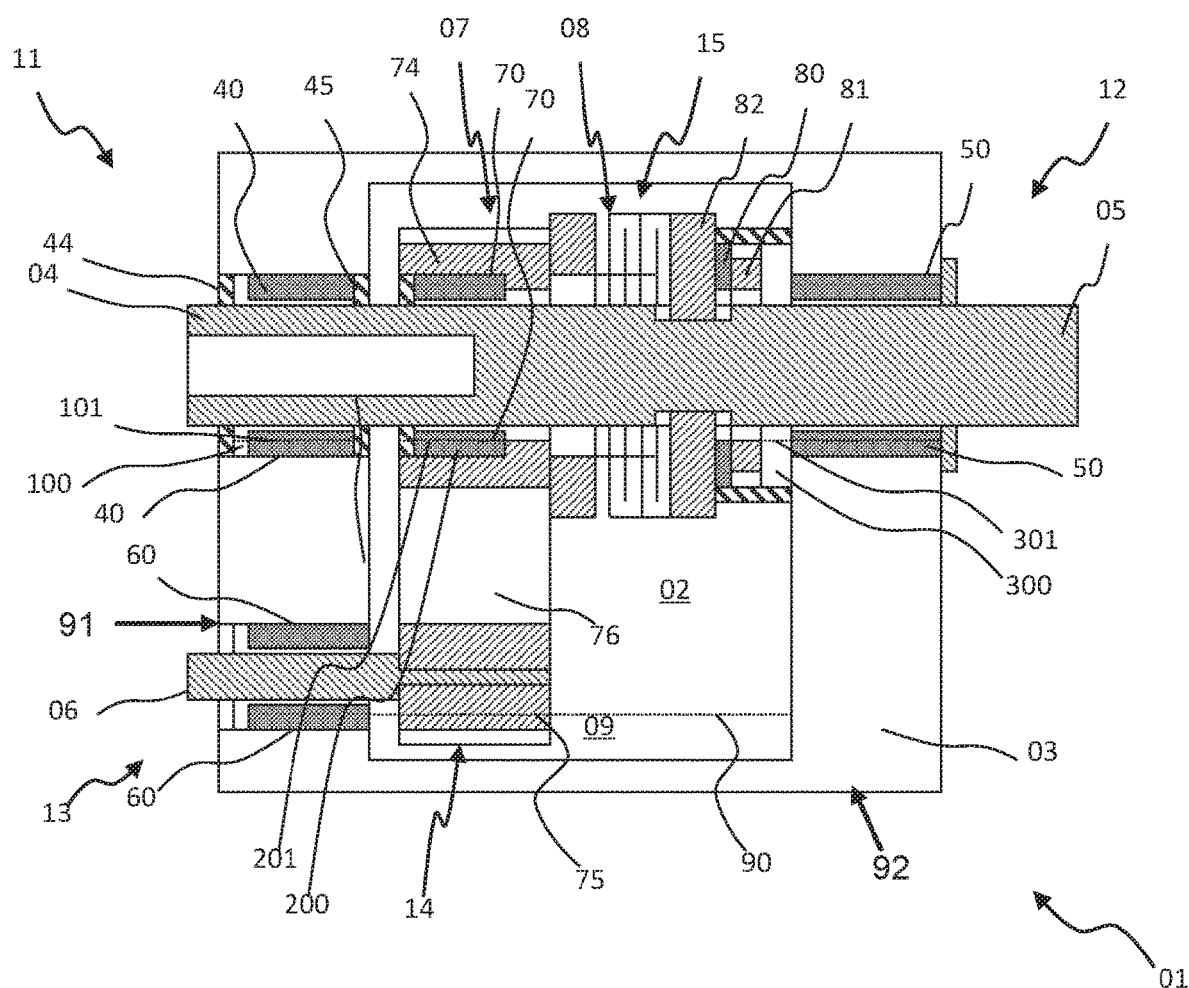
FIG. 1 shows an example of the structure of a transfer case.

The example of a clutch-controlled or "disconnect" transfer case 01, as can be seen in particular in FIG. 1, comprises a housing 03 enclosing a housing interior 02 and basically the following sub-assemblies 11, 12, 13, 14, 15:

a first sub-assembly 11 comprising a drive shaft 04 rotatably supported in the housing 03 and/or in relation to at least a part of at least one other sub-assembly 12, 13, 14, 15 by means of at least one drive shaft bearing 40, a second sub-assembly 12 comprising a primary shaft 05 permanently coupled to the drive shaft 04 and rotatably supported in the housing 03 and/or in relation to at least a part of at least one other sub-assembly 11, 13, 14, 15 by means of at least one primary shaft bearing 50, a third sub-assembly 13 comprising a secondary shaft 06 arranged axially offset in relation to the drive shaft 04 and rotatably supported in the housing 03 and/or in relation to at least a part of at least one other sub-assembly 11, 12, 14, 15 by means of at least one secondary shaft bearing 60, a fourth sub-assembly 14 comprising an offset mechanism 07 arranged between the secondary shaft 06 and the drive shaft 04 and bridging their axial offset, having one or more offset mechanism elements 74, 75, 76 rotatably supported in the housing 03 and/or in relation to at least a part of at least one other sub-assembly 11, 12, 13, 15 by means of offset mechanism bearings 70, and a fifth sub-assembly 15 comprising a clutch 08, wherein the clutch is arranged between the drive shaft 04 and the offset mechanism 07 and serves to couple the secondary shaft 06 to the drive shaft 04 as and when necessary via the offset mechanism 07, having one or more clutch elements 81, 82 rotatably supported in the housing 03 and/or in relation to at least a part of at least the same sub-assembly 15 and/or another sub-assembly 11, 12, 13, 14 by means of one or more clutch bearings 80.

The transfer case 01 also comprises an oil sump 09 situated at the lowest point of the interior 02 of the housing 03 with an oil level 90 lying above the lowest point of the oils sump 09.

In the example of the transfer case 01 the offset mechanism elements 74, 75, 76 of the offset mechanism 07 are an upper chain sprocket 74 (upper toothed wheel 74), a lower chain sprocket 75 (lower toothed wheel 75), and a chain 76 (traction element 76).

The offset mechanism 07 of the transfer case 01 comprises the upper chain sprocket 74 lying above the oil level 90 of the oil sump 09, and the lower chain sprocket 75 at least partially splashing in the oil sump 09, that is to say lying at least partially below the oil level 90 of the oil sump 09. The upper chain sprocket 74 is rotatably supported on the drive shaft 04 by means of at least one offset mechanism bearing 70. The upper chain sprocket 74 and the lower chain sprocket 75 are wrapped by a chain 76. The chain 76 at least partially splashes in the oil sump 09 in the area of the lower chain sprocket 75.

The housing 03 comprises a housing cover 91 and a housing lower part 92.

The bearings 40, 50, 60, 70, 80 of the transfer case 01 differ only according to the bearings 60 involved in the "connect" mode and the bearings 40, 50, 70, 80 further involved in the "disconnect" mode.

Here, not all oil chambers 100, 200, 300 communicate with all the bearings 40, 50, 70, 80 involved in the "disconnect" mode. Each of the bearings 40, 50, 70, 80 arranged above the oil level 90 and further involved in the "disconnect" mode and/or one or more groups each of one or more bearings 40, 50, 70, 80 further involved in the "disconnect" mode has a fluid connection to an oil chamber 100, 200, 300 arranged on a level above the oil level 90 suitable for the bearing or the respective bearings 40, 50, 70, 80.

Each oil chamber 100, 200, 300 has a maximum filling level 101, 201, 301.

The first oil chamber 100, viewed from the housing interior 02, is outwardly defined by a drive shaft sealing ring 44 arranged between the housing 03 and the drive shaft 04. Inwardly towards the housing interior 02 the first oil chamber 100 is preferably defined by a cover plate 45, having one side arranged on the side of the drive shaft bearing 40 remote from the sealing ring 44, the height of which cover plate below the drive shaft 04 predefines the maximum filling level 101 of the first oil chamber 100. The cover plate 45 prevents a volume of oil, trapped between the drive shaft sealing ring 44 and the cover plate 45 up to the height of the cover plate 45 below the drive shaft 04, from flowing off towards the housing interior 02.

The oil supply via the oil chambers is optimized by bores in the housing.

Figure 2:
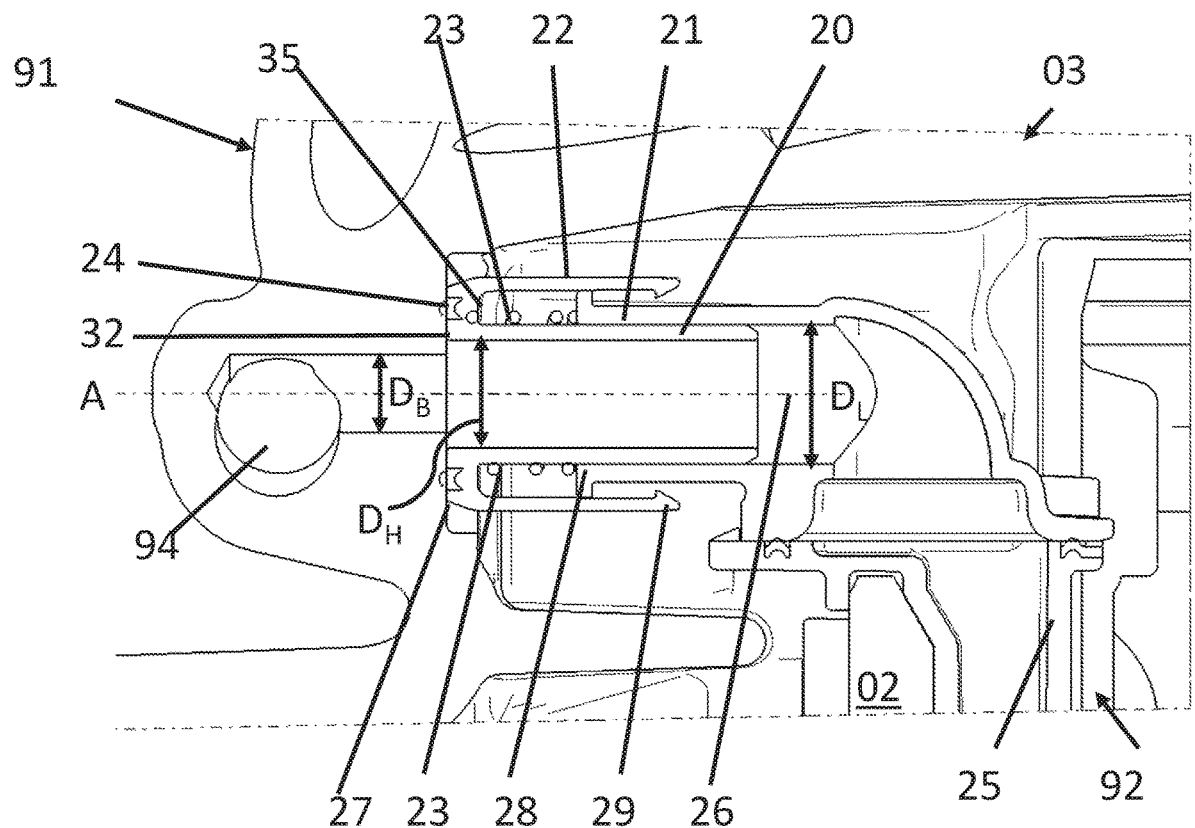
FIG. 2 shows a detail on the drive shaft.

FIG. 2 shows an embodiment of the solution according to the invention.

A transmission housing 03 with its housing interior 02 comprises two housing components. The housing cover 91 here is to be seen as a second component, the housing lower part 92 as the first component.

In the second component, the housing cover 91, there is a bore 94 which serves for the oil supply. The first component 92 in the housing interior 02 comprises a guide device 21 for the oil flow which opens out in an oil duct 25 and is fastened or fixed in the housing. Alternatively, the guide device may also be formed in the housing itself or represented by further components of the transmission.

The guide device 25 is fitted in the first component, so that its opening 26 is directed towards a sealing surface 27 of the first component 92. The precise profile of the guide device, curved or straight, is here adapted to the structural conditions. It is important merely that the opening 26 of a diameter $D_L$ that is constant over the end piece should point towards the sealing surface 27 for the coupling of the first component 92.

The guide device 21 terminates with a radially protruding edge 28, against which a spring 23 is supported. A sleeve 20 is pushed with a slight play into the guide device 21. The sleeve 20 has a broadly overhanging edge in the form of a connecting piece 22, which terminates in hooks 29. The sleeve 20 is pushed into the opening 26 of the guide device 21, which already carries the spring 23. The spring 23 preloads the sleeve 20 held by the u-shaped socket 35 of the connecting piece 22 against the guide device 21, the hooks 29 with the edge 28 serving to prevent the sleeve 20 from going astray.

For assembling, the sleeve 20 is thereby held captive and at the same time preloaded. The hooks 29 may be arranged at a radial interval of 120° from one another, for example.

On the end surface facing away from the interior of the housing, which forms the upper edge 32 of the sleeve, an axial seal 24 is inserted, which serves for sealing between the two components 91, 92. The inner diameter of the sleeve $D_H$ is greater than the diameter $D_B$ of the bore or opening in the second component 91. In assembling, therefore, compensation for positional tolerances is provided, since it is not necessary to assemble the openings in precise conformity with one another. Sealing is provided via the axial seal at a radial distance from both openings, the opening in the sleeve 20 and the opening 94 in the second component 91 on the plane sealing surface 27.

In an axial direction along the axis A compensation for tolerances is afforded by the spring pressure of the spring 23 acting on the sleeve 20, which with its axial seals 24 always bears firmly against the second component 91.

Figure 3:
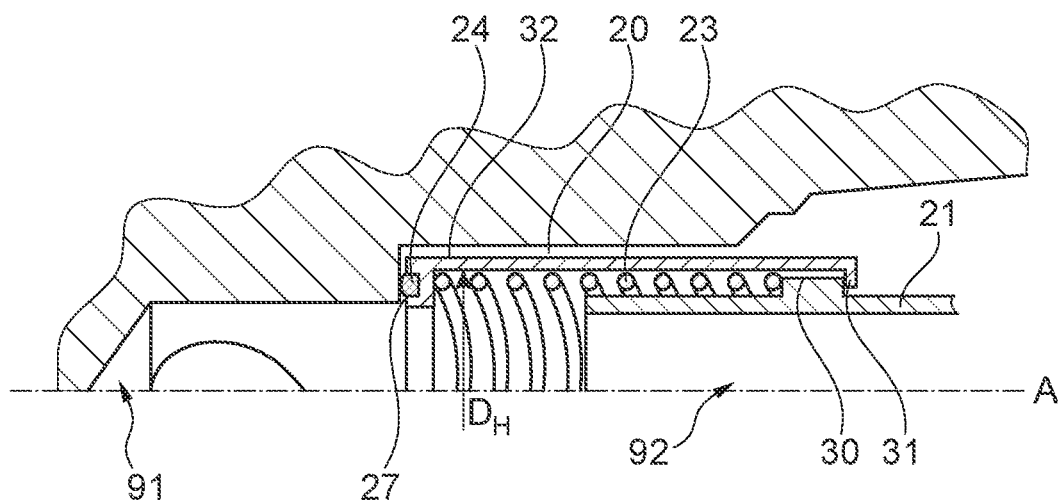
FIG. 3 and FIG. 4 show alternative solutions.

FIG. 3 shows an alternative embodiment of the guide device 21 with sleeve 20 according to the invention. The guide device 21 here has a circumferential guide 30, against which the spring 23 is braced. In this exemplary embodiment the sleeve 20 is situated as a union sleeve outside the guide device 21 and bears against the circumferential guide 30 with its inside wall. The diameter of the sleeve $D_H$ is therefore the outside diameter of the guide device plus the guide DAF. In order that the sleeve does not go astray, it has catches 31 at its end facing into the housing which bear on the circumferential guide 30 of the guide device. These catches 31 may be arranged at the same radial interval from one another. For example, three catches are directed inwards in the sleeve every 120°.

The sleeve terminates at the sealing surface 27 with an edge 32 running inwards. This edge carries the axial seal 24, which can be integrally produced with the sleeve.

With the sleeve 20 pre-fitted on the guide device 21, the first component 92 is attached to the second component 91. The axial seal 24 of the sleeve 20 seals off the components 91, 92 and the spring 23 allows axial tolerances.

Figure 4:
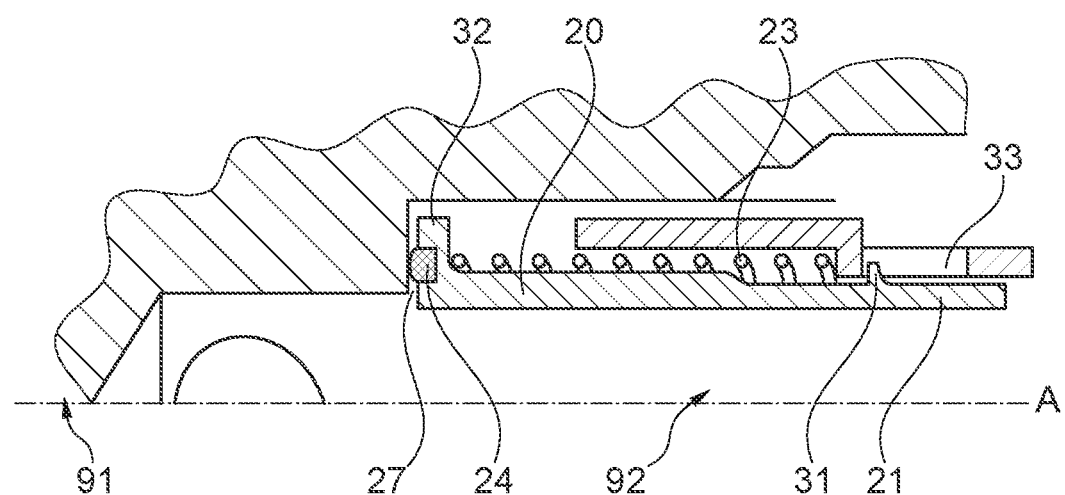

FIG. 4 shows a further embodiment in which the sleeve 20 is likewise inserted inside the guide device 21. The guide device 21 has a shoulder 34, on which the spring 23 is supported. The shoulder separates an end area of the guide device having a large diameter from an initial area having a smaller diameter. A longitudinal groove 33 is situated in the area of the smaller diameter of the guide device. The catches 31 of the sleeve 20 engage in this longitudinal groove 33. The sleeve consists of a cylinder, which is truncated in the housing interior and forms an outward facing edge 32 towards the sealing surface 27.

Here too, the axial seal is either inserted or molded on.

The invention allows a non-destructive and reliable assembly of the transmission, for example the clutch housing, following the installation of the clutch module together with the oil guide device.

The solution is not sensitive to axial tolerances, since these are compensated for by the spring concept. The spring here generates the necessary seal contact pressure against the housing. Moreover, the system is not sensitive to positioning deviations of the sealing site between the oil guide device and the housing. The plane surface in which the seal rests allows shifting within the sealing plane. Such displacements occur due to component variations, positioning tolerances and positional inaccuracies in the assembly process.

LIST OF REFERENCE DESIGNATIONS 01 transfer case
02 housing interior
03 housing
04 drive shaft
05 primary shaft
06 secondary shaft
07 offset mechanism
08 clutch
09 oil sump
11 first sub-assembly
12 second sub-assembly
13 third sub-assembly
14 fourth sub-assembly
15 fifth sub-assembly
20 sleeve
21 guide device
22 connecting piece
23 spring
24 axial seal
25 oil duct
26 opening
27 sealing surface
28 edge, guide device
29 hook
30 guide
31 catch, sleeve
32 edge, sleeve
33 longitudinal groove
34 shoulder
35 u-shaped sockets
40 drive shaft bearing
44 drive shaft sealing ring
45 cover plate
50 primary shaft bearing
60 secondary shaft bearing
70 offset mechanism bearing
74 upper toothed wheel (upper chain sprocket)
75 lower toothed wheel (lower chain sprocket)
76 traction element (chain)
80 clutch bearing
81, 82 clutch elements
90 oil level
91 housing cover, second component
92 housing lower part, first component
94 opening
100 first oil chamber
101 maximum filling level of the first oil chamber
102 bore (in the oil guide baffle element)
103 guide fin system (in the housing lower part)
200 second oil chamber
201 maximum filling level of the second oil chamber
300 third oil chamber
301 maximum filling level of the third oil chamber
$D_{LF}$, $D_H$, $D_L$ $D_B$ diameter
A axis

What is claimed is:

1. A transmission having a housing composed of a first component and a second component for accommodating transmission components, wherein the first component has at least one bore for the supply of oil, wherein the second component has a guide device for oil, wherein the bore and the guide device both open in the direction of a sealing surface between the first and second components, and wherein the guide device engages axially around a sleeve which is under spring preload, or the sleeve is under spring preload and engages axially around the guide device.

2. The transmission as claimed in claim 1, wherein the sleeve bears, on its outer diameter, a spring which is supported against an edge, a guide or a shoulder of the guide device.

3. The transmission as claimed in claim 2, wherein the spring bears against the sleeve at a radially outwardly formed edge of the sleeve.

4. The transmission as claimed in claim 1, wherein the sleeve bears, on its inner diameter, a spring which is supported against an edge, a guide or a shoulder of the guide device.

5. The transmission as claimed in claim 4, wherein the spring bears against the sleeve at a radially inwardly formed edge of the sleeve.

6. The transmission as claimed in claim 1, wherein the guide device is a component installable in the housing.

7. The transmission as claimed in claim 1, wherein the sleeve has an axial seal at an end side on the sealing surface.

8. The transmission as claimed in claim 7, wherein the axial seal is inserted or injection-molded.

9. The transmission as claimed in claim 1, wherein a diameter of an opening of one of the first and second components is smaller than an inner diameter of the sleeve.

10. The transmission as claimed in claim 1, wherein the sleeve has a connecting means for connecting to the guide device.

11. A method for assembling a transmission, wherein the transmission includes having a housing comprised of a first component and a second component for accommodating transmission components, wherein the first component has at least one bore for the supply of oil, wherein the second component has a guide device for oil, wherein the bore and the guide device both open in the direction of a sealing surface between the first and second components, wherein the guide device engages axially around a sleeve which is under spring preload, or the sleeve is under spring preload and engages axially around the guide device, wherein the method comprises:

joining together the first and second components of the housing at a sealing surface;

equipping the guide device to the sleeve (20) with a connecting means;

preloading a spring between the guide device and the sleeve.

\* \* \* \* \*